UNITED STATES PATENT OFFICE
PTO – BOYERS, PA DUTY STATION

---

PAGE NOT AVAILABLE

PATENT NUMBER X5937 FOR THE ISSUE DATE 4 / 27 / 1830 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X5937 Apl 27.1830

Benjamin Hinkley

Letters Patent.

The Schedule referred to in these Letters Patent and making part of the same containing a description in the words of the said Benjamin Hinkley himself of his improvement in the machine for glueing Veneers on ~~ou~~ columns or pillars This machine is sustained by a frame of the following construction viz. two sills of suitable timber two and a half feet long. and 3 by 4 inches square, in each of these sills set the feet of two posts which are three feet high. made of joists of suitable timber three inches square and three from the ends of the frame. The sides are connected by two girths that are framed into the posts. the upper edges of the girths being about one foot below the top of the posts. the intermediate space between the girths being two and a half inches. The machine consists of two head blocks, one of which is fastened on the top of the posts in one end, projecting two and a half inches over the outside of the posts, and the ends projecting equal distances from the sides of the frame. The other head block is moveable, and consists of a plank placed in a vertical position between the girths with suitable shoulders to the same resting on the upper side of the girths. and on the upper end of this is framed a block of timber of the same dimensions as the head block. stationed on the upper ends of the posts at the other end of the frame. In each of the head blocks. which are two feet long is cut a mortise entirely through the block about eighteen inches long & one inch wide. To each of these head blocks belongs a cap piece two & a half inches thick and 3 inches wide thro which are mortises corresponding with those before mentioned. The blocks and cap pieces are perforated through between the mortices and the ends. and to these perforations screws are fitted of a convenient size made of wood or iron or some other suitable material with nuts suited to to the same — Between the head blocks is a moveable vice composed of a block of timber about 20 inches long and 3 by 4 inches square. from which a stem passes below, between the girths. and a key works thro' the stem at the underside of the girths. In this block are two mortises about nine inches apart. and in these mortises are set the ends of two pieces of timber about 14 inches long and 2 by 3 inches square. The upper ends of these are curved. the convex sides laying

400. X 5937 inwards to receive the column or pillar to be veneered. and thro these a screw passes
by which the columns are pressed together. in one end of the vice block is a piece of tim
ber placed vertically and extending upward about 3 feet in the upper end of which
is a pulley. on the same side of the machine is a lever five feet in length. one end
of which is attached to a post of the machine. and a weight of sufficient heft
attached to the other end. to keep the wrapper fast. a cord attached to the
lever passes over the above mentioned pulley and the end is confined to a wrap
per which is a piece of canvass cloth glazed over with Bees wax. the wrapper
to be two inches longer and about six inches wider than the veneer. the end of the
wrapper to which the cord is confined is supported ~~is supported~~ by a piece of
inch board about 3 inches wide. the column is prepared by cutting a groove in one
side from end to end large enough to receive one edge of the wrapper and fitting
one end to the mortice in a crank or lever to be used in the operation. Two col-
umns are then placed on the head blocks where they are confined by securing
the cap pieces down. on the upper sides and entering suitable keys thro the
mortises in the cap pieces and blocks and screwing up the vice in the middle
of the columns. The lower end of the wrapper is fastened in the groove in one
column by glueing and the veneer to be used is placed on the column so as to bring
the edge of the veneer in contact with the wrapper. By affixing the crank
or lever to the end of the column to be veneered and turning the same inward
the veneer is drawn in between the wrapper and column and being pressed close
as it passes between the columns is duly fitted in the work. the glue is applied
as the column turns. the column remains in the machaine until the glue is
dry and is then dismissed by cutting the wrapper at the groove. when
another column is placed in the machine and the operation is repeated. The
size of the machine may be varied so as to be adapted to the columns of any
convenient size Exd. W.C.

Witnesses
Dudley Moody
Samuel T. Paige

Benjamin Hinkley (870 [illegible])